US012127695B2

(12) United States Patent
Parker

(10) Patent No.: US 12,127,695 B2
(45) Date of Patent: Oct. 29, 2024

(54) METHOD AND APPARATUS FOR DISPLAYING A SHIRT

(71) Applicant: GASS LLC, Fairfield, CT (US)

(72) Inventor: Robert Parker, Fairfield, CT (US)

(73) Assignee: GASS LLC, Fairfield, CT (US)

( * ) Notice: Subject to any disclaimer, the term of this patent is extended or adjusted under 35 U.S.C. 154(b) by 21 days.

(21) Appl. No.: 18/133,172

(22) Filed: Apr. 11, 2023

(65) Prior Publication Data

US 2023/0320500 A1 Oct. 12, 2023

Related U.S. Application Data

(60) Provisional application No. 63/330,119, filed on Apr. 12, 2022.

(51) Int. Cl.
*A47F 8/00* (2006.01)
*G09F 15/00* (2006.01)
*G09F 23/06* (2006.01)

(52) U.S. Cl.
CPC ............ *A47F 8/00* (2013.01); *G09F 15/0018* (2013.01); *G09F 23/06* (2013.01)

(58) Field of Classification Search
CPC .... A47G 25/25; A47G 25/0664; A47G 25/20; A47F 8/00; G09F 15/0018; G09F 23/06
See application file for complete search history.

(56) References Cited

U.S. PATENT DOCUMENTS 2,481,561 A * 9/1949 Beall ........................ A41H 5/01 223/68
2,901,154 A * 8/1959 Baldwin .................. A41H 5/00 223/68
3,084,837 A * 4/1963 Wolf ......................... A47F 8/00 223/68
3,202,328 A * 8/1965 Burrell ...................... A47F 8/00 223/67
3,330,452 A * 7/1967 Henderson ................ A47F 8/02 223/68
3,512,191 A 5/1970 Wall
3,713,375 A 1/1973 Bianchino
3,992,733 A 11/1976 Racine
4,573,927 A 3/1986 Newman
4,959,879 A 10/1990 Marxhausen
4,964,549 A * 10/1990 Schwab .................... A47F 8/00 223/66
5,027,457 A 7/1991 Sweet
D318,889 S 8/1991 Van Staagen et al.
(Continued)

FOREIGN PATENT DOCUMENTS

GB 2156301 A * 10/1985 ........... B65D 85/182

*Primary Examiner* — Ismael Izaguirre
(74) *Attorney, Agent, or Firm* — FORGE IP, PLLC

(57) ABSTRACT

An apparatus particularly adapted for displaying a shirt includes a core of resilient material configured to simulate a human torso having a chest simulating surface, a back simulating surface, left and right truncated shoulder surfaces and a truncated waist surface. Each of the left and right truncated shoulder surfaces has an opening formed therein, the opening adapted to receive arm portions of the shirt when the shirt is disposed on the apparatus, and the truncated waist surface has an opening formed therein, the opening adapted to receive a waist portion of the shirt when the shirt is disposed on the apparatus.

28 Claims, 11 Drawing Sheets

(56) References Cited

U.S. PATENT DOCUMENTS

| | | | | |
|---|---|---|---|---|
| 5,152,331 | A | 10/1992 | Barone | |
| 5,244,131 | A | 9/1993 | Hollingsworth | |
| 5,383,635 | A | 1/1995 | Barone | |
| 5,515,545 | A | 5/1996 | Becton | |
| 5,515,563 | A | 5/1996 | Chao | |
| 6,038,719 | A | 3/2000 | Castagna | |
| 6,047,421 | A | 4/2000 | Barone | |
| D484,348 | S | 12/2003 | Pappas | |
| D486,342 | S | 2/2004 | Suzuki | |
| D603,644 | S | 11/2009 | Ketner | |
| 7,891,032 | B1 | 2/2011 | Ryan | |
| 8,046,844 | B2 | 11/2011 | Takano et al. | |
| 8,615,830 | B2 | 12/2013 | McQuoid | |
| 9,538,865 | B2 | 1/2017 | Wegener | |
| 9,914,635 | B2 | 3/2018 | Guzman et al. | |
| 2005/0177941 | A1 | 8/2005 | Miller | |
| 2012/0000870 | A1 * | 1/2012 | Denby | A47F 7/19<br>211/85.3 |
| 2014/0082846 | A1 | 3/2014 | Blazar | |
| 2018/0153240 | A1 | 6/2018 | Brattli | |

* cited by examiner

METHOD AND APPARATUS FOR DISPLAYING A SHIRT

FIELD OF THE INVENTION

The present invention relates generally to a method and apparatus for displaying a shirt, such as a t-shirt, and more particularly to such a method and apparatus that allows for the shirt to be displayed without alteration of and/or damage to the shirt.

BACKGROUND OF THE INVENTION

There are a plethora of known solutions for displaying shirts in a commerce-focused environment, the overwhelming majority of which are variations of the standard mannequin. These solutions often involve the use of hollow, rigid molded forms, with some of these molded plastic versions reproducing only the front half of a torso. However, these solutions fail to meet the needs of independent vendors because they are generally made of hard plastic and subject to damage when handled often, as might happen at open-air markets and other temporary retail venues. In addition, these mannequin-type displays are not something that a customer would ordinarily pick up and look at themselves, nor would a customer generally desire to have such a display apparatus in his/her home.

Inflatable mannequin solutions attempt to overcome any weight issues. Still, these solutions are similarly unable to meet the needs of the industry because they are also susceptible to damage, which result in their instant inoperability. The remaining solutions seek to approximate the effects of retail-style mannequins. Still, these solutions also fail to meet independent vendor needs because they cannot be easily held and inspected by a prospective buyer. Even in a dedicated retail environment, touching or handling of the display mannequins is generally frowned upon.

In the area of home decor, the Internet offers hundreds of pages devoted to re-purposing t-shirts as various household items as a way to express one's personality through personalized décor. For example, one can find many hundreds of web sites where instructions are provided to transform pre-printed t-shirts into quilts, pillows, totes, or other practical items. All of these methods, however, are decidedly permanent. At a minimum, these solutions require alteration of the shirts, while in most cases, the shirts are completely destroyed. Thus, one simply does not have the option of displaying one's readily available pre-printed t-shirts as a decorative throw pillow or the like in such a way so as to allow them to be quickly and fully returnable to wearable status. Consequently, most people utilize only "old" t-shirts for these projects.

However, in many situations, it may be desirable to have a device and associated method that allows for the display of a shirt without any necessity of sewing, glue, or any alteration or risk of damage to the t-shirt. Such a device and method would allow the user an opportunity to display a brand new or beloved t-shirt purchased on a recent vacation or at an event, knowing that they will be able to also wear their new t-shirt whenever they please.

It would be desirable to have an apparatus that can be used as a shirt display device that is lightweight, easily reconfigurable, and easily transportable for point-of-sale purposes, such as, but not limited to, flea markets, fairs, and festivals where traditional heavy, hard plastic mannequins are impractical to use and a lightweight, soft device would be easier and quicker for setting up and dismantling temporary retails sales displays.

Furthermore, it would also be desirable to have an apparatus that can be used to display a shirt in a residential or office environment where a shirt may be displayed at a moment's notice and any prior displayed shirt may be instantly returned to normal use.

Still, further, it would be desirable to have an apparatus that can be used to display a shirt in a residential or office setting where the composition and materials utilized lend themselves to being pillow-like, such that the device while displaying a shirt can also be utilized as a comfortable and decorative throw pillow.

The present invention, therefore, aims to provide a method and apparatus for displaying a shirt, such as a t-shirt, that is relatively lightweight and amenable to handling, that is particularly well-suited for in-home or in-office use, and that does not require alteration of and/or damage to the shirts being displayed, whereby shirts being displayed can be quickly and fully returnable to wearable status.

SUMMARY OF THE INVENTION

In accordance with one aspect of the present invention, an apparatus particularly adapted for displaying a shirt when the shirt is disposed on the apparatus includes a core of resilient material configured to simulate a human torso. The core of resilient material includes a chest simulating surface, a back simulating surface, left and right truncated shoulder surfaces extending between the chest simulating surface and the back simulating surface and a truncated waist surface extending between the chest simulating surface and the back simulating surface. Each of the left and right truncated shoulder surfaces has an opening formed therein, the opening adapted to receive arm portions of the shirt when the shirt is disposed on the apparatus, and the truncated waist surface has an opening formed therein, the opening adapted to receive a waist portion of the shirt when the shirt is disposed on the apparatus.

In some embodiments, the left and right truncated shoulder surfaces are generally parallel to one another and the truncated waist surface is generally perpendicular to the left and right truncated shoulder surfaces.

In some embodiments, the openings formed in the left and right truncated shoulder surfaces and the opening formed in the truncated waist surface each comprises a slit. In certain of these embodiments, the openings formed in the left and right truncated shoulder surfaces and the opening formed in the truncated waist surface each further comprises a cavity in the core of resilient material in communication with the slit, each cavity adapted to receive shirt material inserted through the slit. In certain embodiments, the slits formed in the left and right truncated shoulder surfaces and the slit formed in the truncated waist surface each comprises a generally linear slit disposed generally parallel to the chest simulating surface and the back simulating surface. In certain embodiments, the slits formed in the left and right truncated shoulder surfaces and the slit formed in the truncated waist surface each comprises a generally arcuate slit. In certain embodiments, the slits formed in the left and right truncated shoulder surfaces and the slit formed in the truncated waist surface each comprises a serrated slit.

In some embodiments, the core of resilient material further comprises a truncated neck surface extending between the chest simulating surface and the back simulating surface. In certain of these embodiments, the truncated neck surface comprises printed material thereon, the printed material sized and positioned for display through a neck opening of the shirt when the shirt is disposed on the apparatus. In certain embodiments, the truncated neck surface comprises an opening formed therein, the opening in the truncated neck surface being adapted to receive at least one display enhancement.

In some embodiments, the resilient material comprises at least one of the following: feathers, polymeric foam, natural fibers and synthetic fibers. In certain of these embodiments, the resilient material comprises skinned polyurethane foam. In certain embodiments, the resilient material comprises at least one layer of polyester fiber batting. In certain of these embodiments, the at least one layer of polyester fiber batting comprises at least one layer of densified polyester fiber batting. In certain of these embodiments, the at least one layer of polyester fiber batting comprises at least one layer of polyethylene terephthalate fiber batting.

In some embodiments, the core of resilient material further comprises an inflatable air-filled portion. In some embodiments, the core of resilient material further comprises an outer material layer. In certain of these embodiments, the outer material layer is removable. In certain embodiments, the outer material layer is formed from a material that possesses at least one of the following properties: water resistance, mold resistance, mildew resistance and stain resistance.

In some embodiments, the apparatus further includes a torso extension member attachable to the truncated waist surface. In certain of these embodiments, the torso extension member is attachable to the truncated waist surface by cooperation with the opening formed in the truncated waist surface. In some embodiments, the apparatus further includes a stand accessory adapted to position the apparatus in an upright orientation. In certain of these embodiments, the stand accessory cooperates with the opening formed in the truncated waist surface.

In accordance with another aspect of the invention, an apparatus particularly adapted for displaying a shirt when the shirt is disposed on the apparatus includes a core of resilient material configured to simulate a human torso. The core of resilient material includes a chest simulating surface, a back simulating surface, left and right truncated shoulder surfaces extending between the chest simulating surface and the back simulating surface, the left and right truncated shoulder surfaces being generally parallel to one another, and a truncated waist surface extending between the chest simulating surface and the back simulating surface, the truncated waist surface being generally perpendicular to the left and right truncated shoulder surfaces, and a truncated neck surface extending between the chest simulating surface and the back simulating surface. Each of the left and right truncated shoulder surfaces has a slit formed therein, the slit adapted to receive arm portions of the shirt when the shirt is disposed on the apparatus, and the truncated waist surface has a slit formed therein, the slit adapted to receive a waist portion of the shirt when the shirt is disposed on the apparatus.

In some embodiments, the slits formed in the left and right truncated shoulder surfaces and the slit formed in the truncated waist surface each further comprises a cavity in the core of resilient material in communication with the slit, each cavity adapted to receive shirt material inserted through the slit.

In some embodiments, the truncated neck surface comprises printed material thereon, the printed material sized and positioned for display through a neck opening of the shirt when the shirt is disposed on the apparatus. In some embodiments, the truncated neck surface comprises an opening formed therein, the opening in the truncated neck surface being adapted to receive at least one display enhancement.

In accordance with a further aspect of the present invention, a combined shirt and display apparatus includes a core of resilient material configured to simulate a human torso. The core of resilient material includes a chest simulating surface, a back simulating surface, left and right truncated shoulder surfaces extending between the chest simulating surface and the back simulating surface and a truncated waist surface extending between the chest simulating surface and the back simulating surface. A shirt is positioned over the core of resilient material with arm portions of the shirt positioned adjacent to the left and right truncated shoulder surfaces and with a waist portion of the shirt positioned adjacent to the truncated waist surface. Each of the left and right truncated shoulder surfaces has an opening formed therein, the opening receiving therein the arm portions of the shirt, and the truncated waist surface has an opening formed therein, the opening receiving therein the waist portion of the shirt.

Other features and advantages of the invention will become more apparent from consideration of the following drawings.

DETAILED DESCRIPTION OF THE INVENTION

Figure 1:
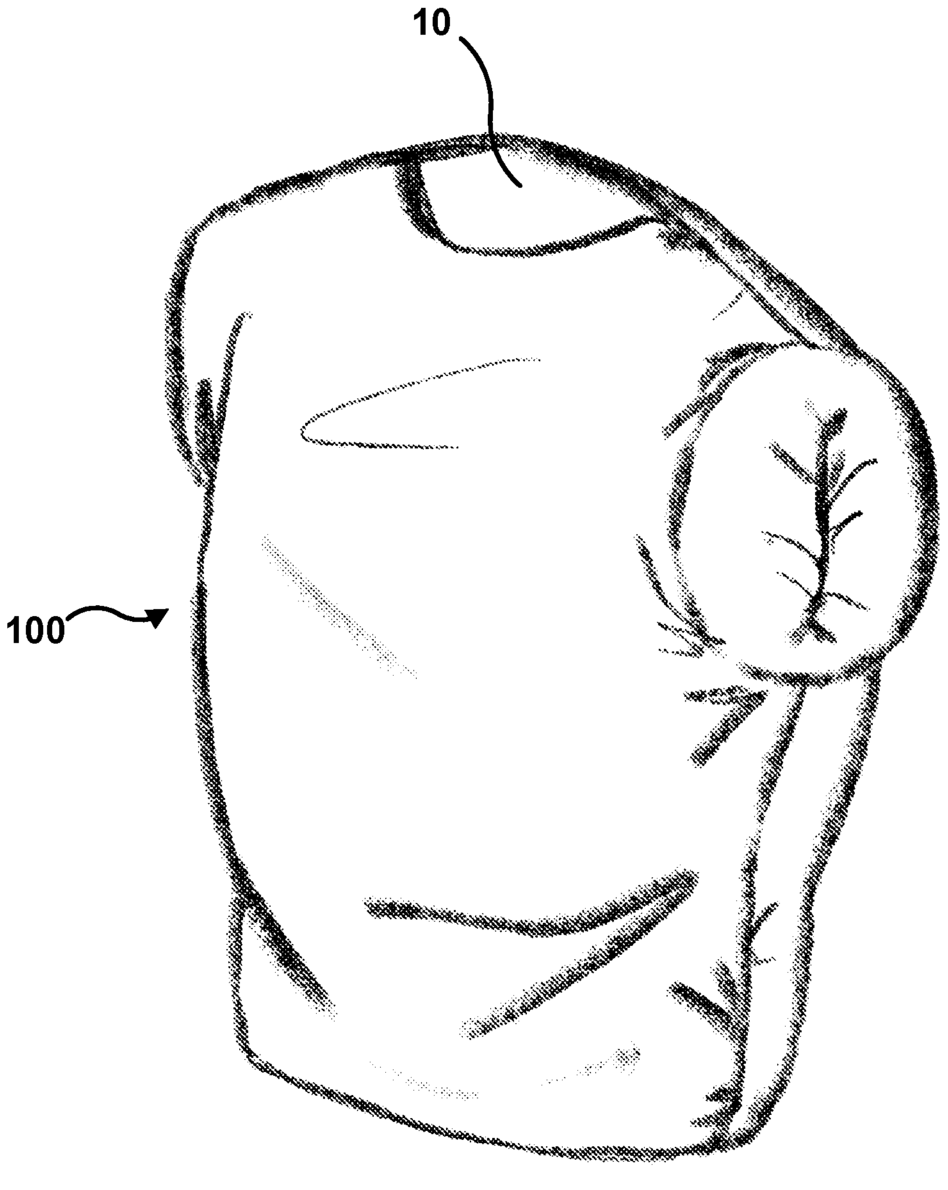
FIG. 1 is a side isometric view of an apparatus particularly adapted for displaying a shirt in accordance with an exemplary embodiment of the present invention, with a shirt disposed on the apparatus.

The present invention may be further understood with reference to the following description and the appended drawings, wherein like elements are referred to with the same reference numerals. Referring first to FIGS. 1 and 2A-2C, shown is an apparatus (10) particularly adapted for displaying a shirt when the shirt (100) is disposed on the apparatus (shown only in FIG. 1), which includes a core (12) of resilient material configured to simulate a human torso. The core (12) of resilient material includes a chest simulating surface (14), a back simulating surface (16), left and right truncated shoulder surfaces (18, 20) extending between the chest simulating surface (14) and the back simulating surface (16) and a truncated waist surface (22) extending between the chest simulating surface (14) and the back simulating surface (16). Each of the left and right truncated shoulder surfaces (18, 20) has an opening (24) formed therein, the opening (24) adapted to receive arm portions of the shirt when the shirt is disposed on the apparatus (10), and the truncated waist surface (22) has an opening (26) formed therein, the opening (26) adapted to receive a waist portion of the shirt when the shirt is disposed on the apparatus (10).

Figure 2A:
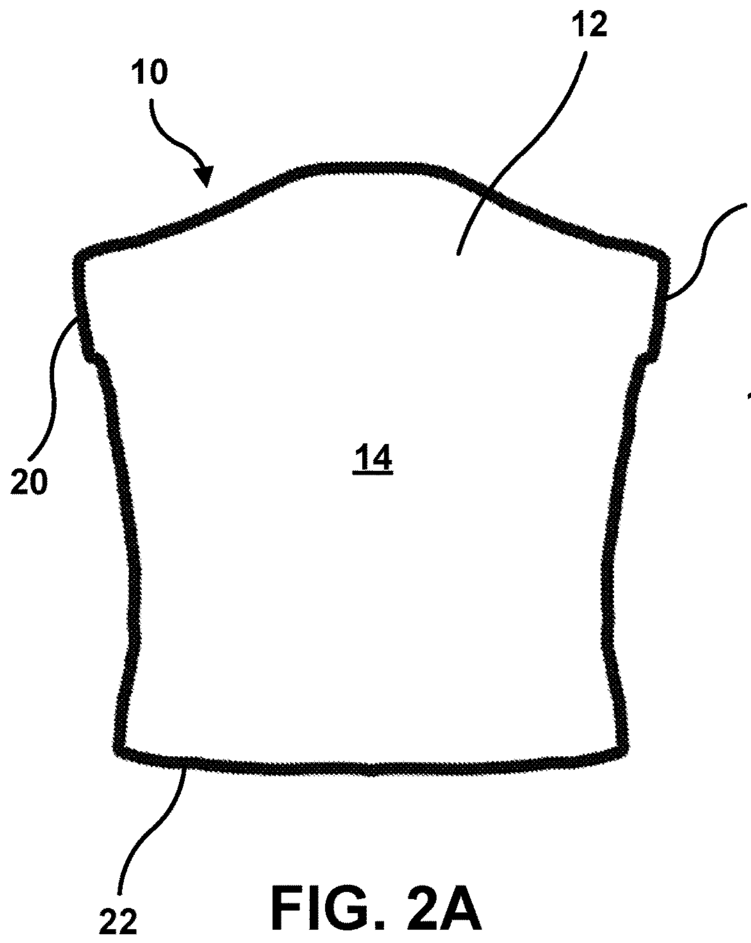
FIG. 2A is a front elevational view of the apparatus for displaying a shirt of FIG. 1.

As best seen in FIG. 2A, the left and right truncated shoulder surfaces (18, 20) are generally parallel to one another, although there may be some slight angle between them. By "generally parallel," what is meant is that the left and right truncated shoulder surfaces (18, 20) are no more than 15° offset from being parallel to one another. For example, with respect to the orientation shown in FIG. 2A, the left and right truncated shoulder surfaces (18, 20) are each angled approximately 5° with respect to an imaginary plane bisecting the core (12) into left and right halves, such that a total offset from being parallel to one another is approximately 10°. Also as best seen in FIG. 2A, the truncated waist surface (22) is generally perpendicular to the left and right truncated shoulder surfaces (18, 20). By "generally perpendicular," what is meant is that the angle between the truncated waist surface (22) and each of the left and right truncated shoulder surfaces (18, 20) is between about 80° and about 100°. The truncated waist surface (22) may be generally planar (as shown in the Figures), or it may be rounded/curved, as desired.

Figure 2B:
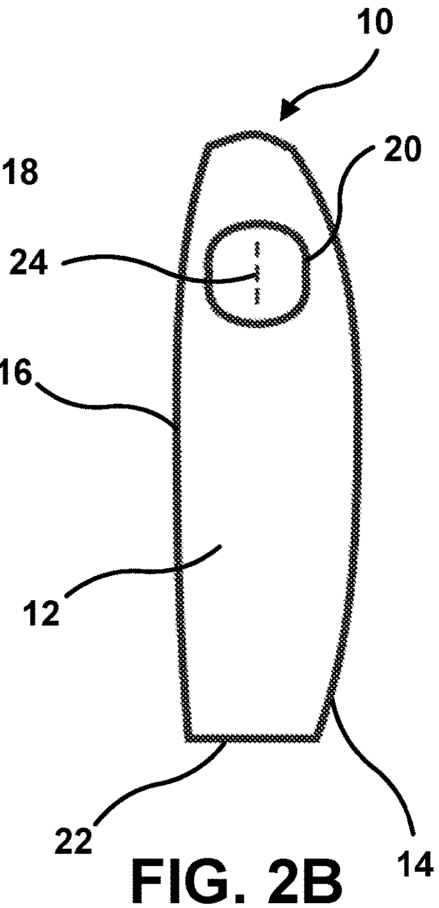
FIG. 2B is a side elevational view of the apparatus for displaying a shirt of FIG. 1.
Figure 2C:
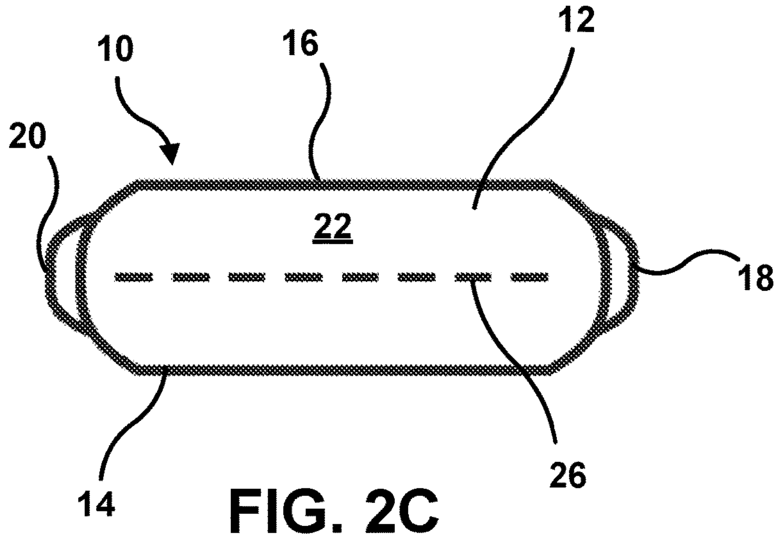
FIG. 2C is a bottom plan view of the apparatus for displaying a shirt of FIG. 1.
Figure 3A:
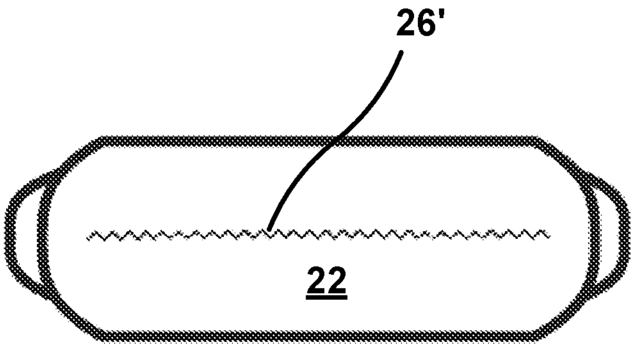
FIG. 3A is a bottom plan view of the apparatus for displaying a shirt similar to that shown in FIG. 2C, but wherein an opening in the truncated waist surface is configured as a serrated slit.
Figure 3B:
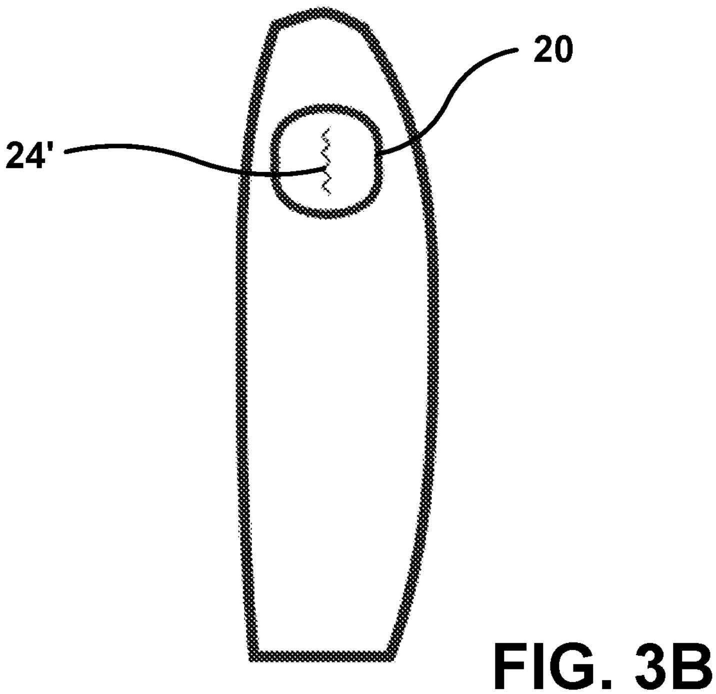
FIG. 3B is a side elevational view of the apparatus for displaying a shirt similar to that shown in FIG. 2B, but wherein an opening in the truncated shoulder surface is configured as a serrated slit.
Figure 4A:
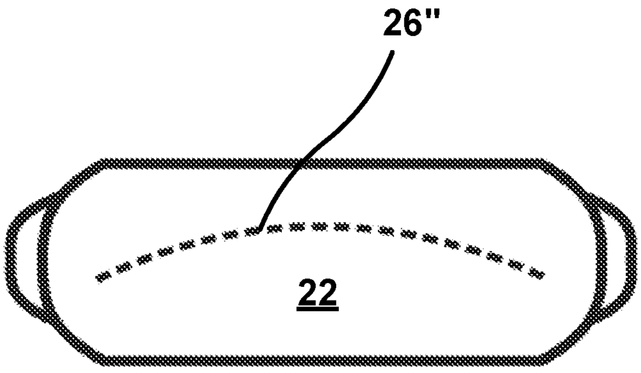
FIG. 4A is a bottom plan view of the apparatus for displaying a shirt similar to that shown in FIG. 2C, but wherein an opening in the truncated waist surface is configured as an arcuate slit.
Figure 4B:
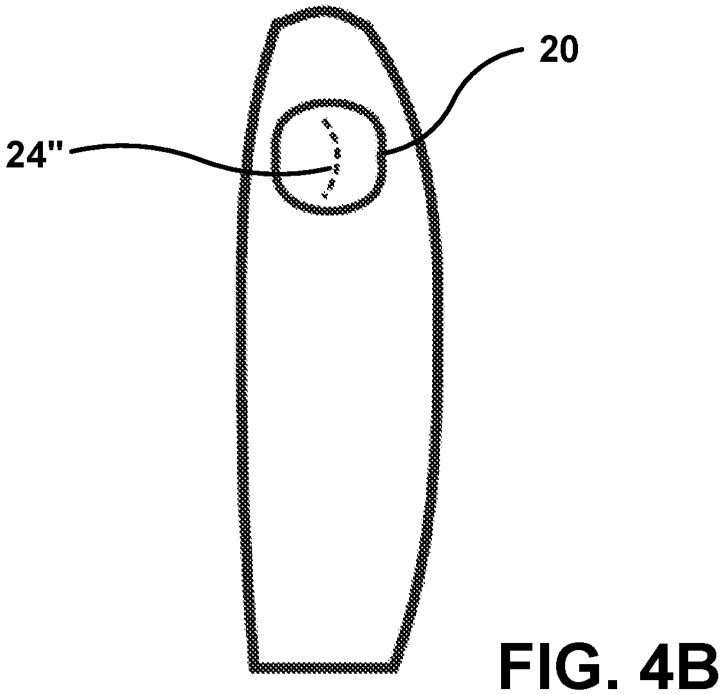
FIG. 4B is a side elevational view of the apparatus for displaying a shirt similar to that shown in FIG. 2B, but wherein an opening in the truncated shoulder surface is configured as an arcuate slit.

As best seen in FIGS. 2B and 2C, the openings (24) formed in the left and right truncated shoulder surfaces (18,

20) and the opening (26) formed in the truncated waist surface (22) each comprises a slit. Specifically, in this embodiment, each of the slits defining openings (24, 26) comprises a generally linear slit disposed generally parallel to the chest simulating surface (14) and the back simulating surface (16). However, other configurations for the slits are also contemplated. For example, the slits defining openings (24') in the left and right truncated shoulder surfaces (18, 20) and/or the slit defining the opening (26') in the truncated waist surface (22) may comprise serrated or "egg crate" type slits, as shown in FIGS. 3A and 3B. It has been found that such a slit configuration may provide for enhanced gripping of the shirt sleeve portions and/or waist portion in certain situations so as to enhance retention of the shirt on the display apparatus (10). As still another example, the slits defining openings (24") in the left and right truncated shoulder surfaces (18, 20) and/or the slit defining the opening (26") in the truncated waist surface (22) may comprise arcuate or curved type slits, as shown in FIGS. 4A and 4B. It has been found that such a slit configuration may also provide for enhanced gripping of the shirt sleeve portions and/or waist portion in certain situations so as to enhance retention of the shirt on the display apparatus (10).

The core (12) of resilient material and the corresponding components thereof are preferably sized and shaped to correspond with a standard clothing size (e.g., XS, S, M, L, XL, XXL, 3XL, etc.), with apparatus (10) representing various standard sizes optimally being made available. Provision may be made for child sizes and adult sizes, as well as for men's sizes and women's sizes. If desired, the core (12) of resilient material may be configured to correspond to the shape of a male torso or of a female torso. The core (12) of resilient material may also be configured to correspond to tall sizes, or separate provisions for such may be provided (as explained more fully below with respect to FIG. 9).

Figure 5A:
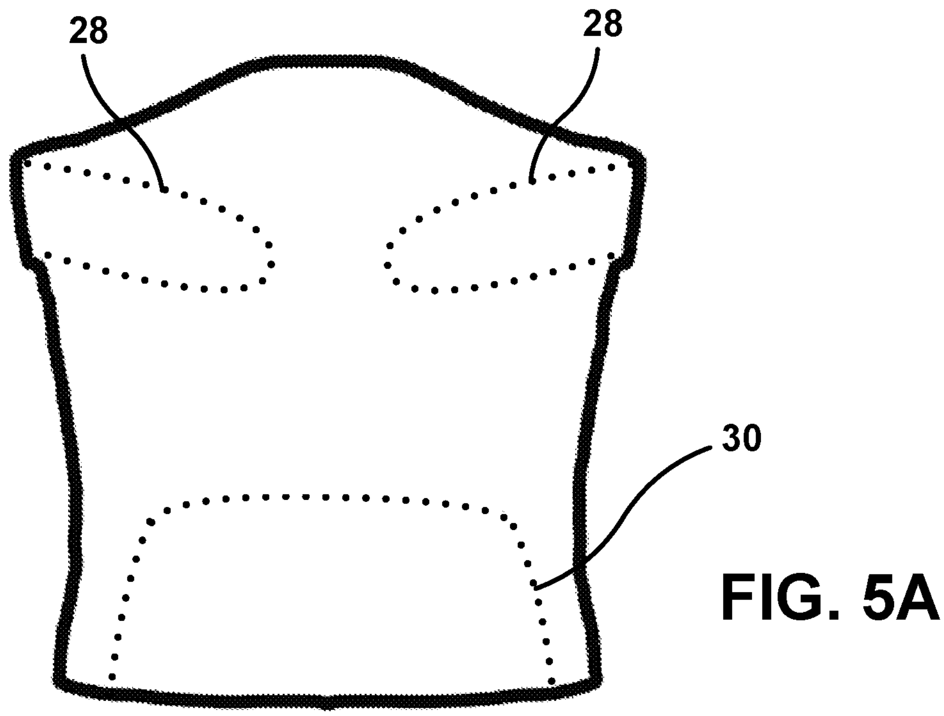
FIG. 5A is a front elevational view of the apparatus for displaying a shirt of FIG. 1, shown with cavities adapted to receive shirt material.
Figure 5B:
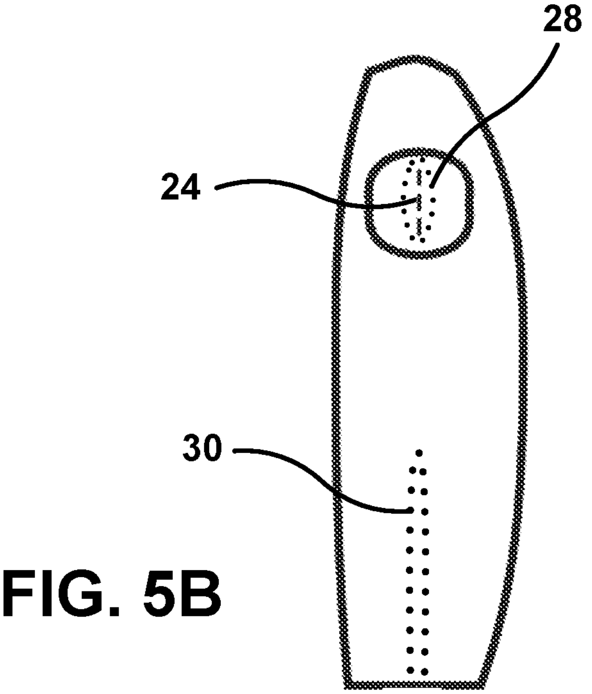
FIG. 5B is a side elevational view of the apparatus for displaying a shirt of FIG. 1, shown with cavities adapted to receive shirt material.

Referring now to FIGS. 5A and 5B, the openings (24) formed in the left and right truncated shoulder surfaces (18, 20) may each be in communication with a cavity (28) formed within the core (20) of resilient material, each cavity adapted to receive shirt material inserted through the openings (24). Similarly, the opening (26) formed in the truncated waist surface (22) may be in communication with a cavity (30) formed within the core (20) of resilient material, the cavity adapted to receive shirt material inserted through the opening (26). The cavities (28, 30) may be particularly advantageous, for example, when long-sleeved shirts are to be displayed, when elongated (e.g., tall) shirts are to be displayed and/or when shirts formed from bulky materials are to be displayed. In such cases, the cavities (28, 30) may help prevent distortion of the core (12) of resilient material when shirt material is tucked into the openings (24, 26).

Figure 6A:
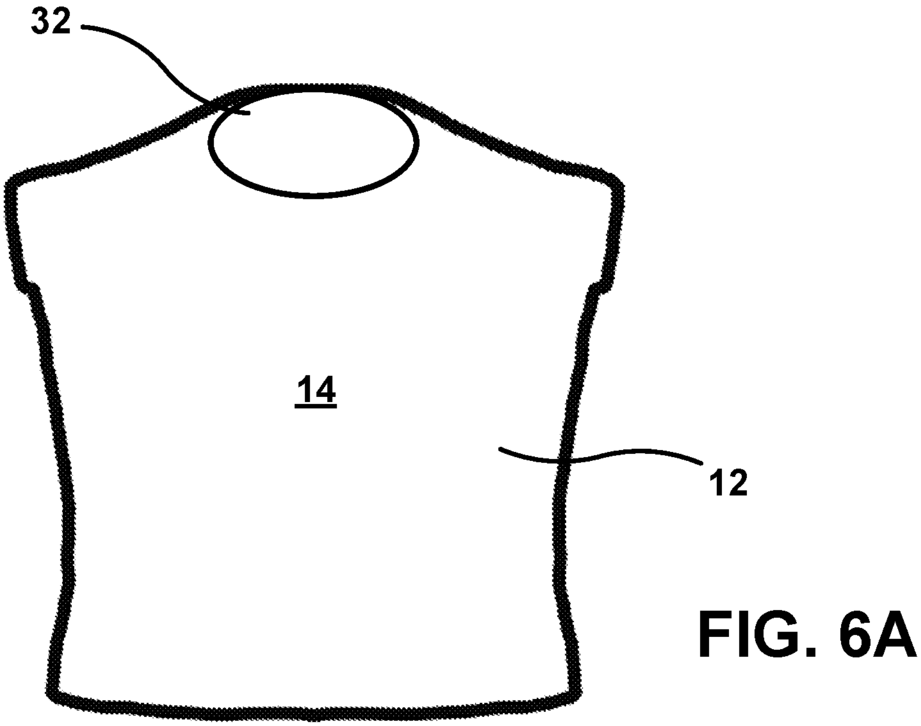
FIG. 6A is a front elevational view of the apparatus for displaying a shirt similar to that shown in FIG. 2A, but further including a truncated neck surface.
Figure 6B:
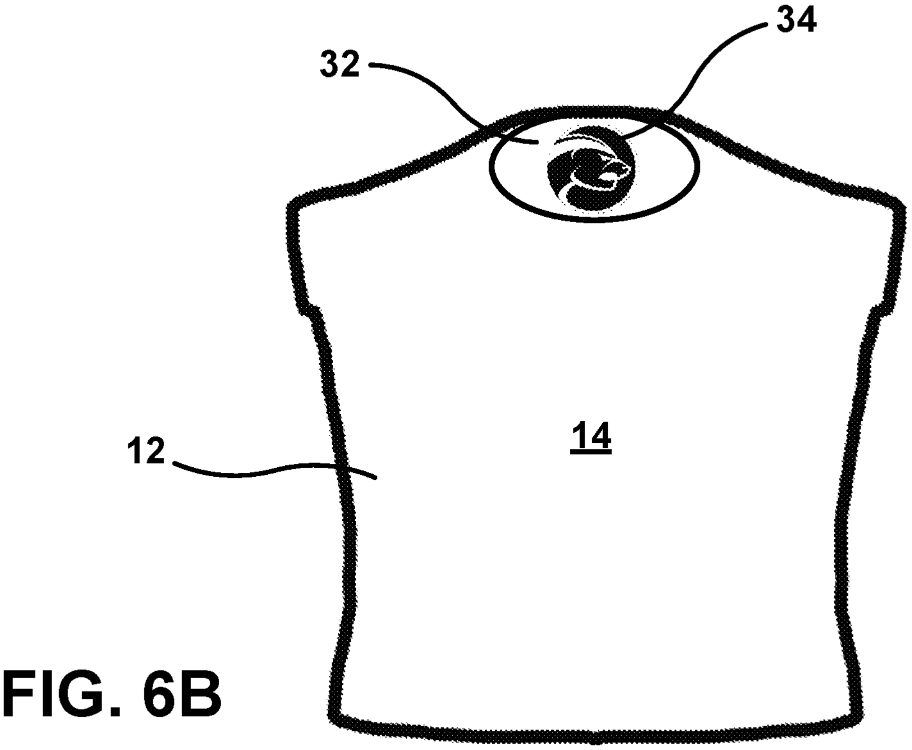
FIG. 6B is a front elevational view of the apparatus for displaying shown in FIG. 6A, wherein the truncated neck surface includes printed material thereon.
Figure 6C:
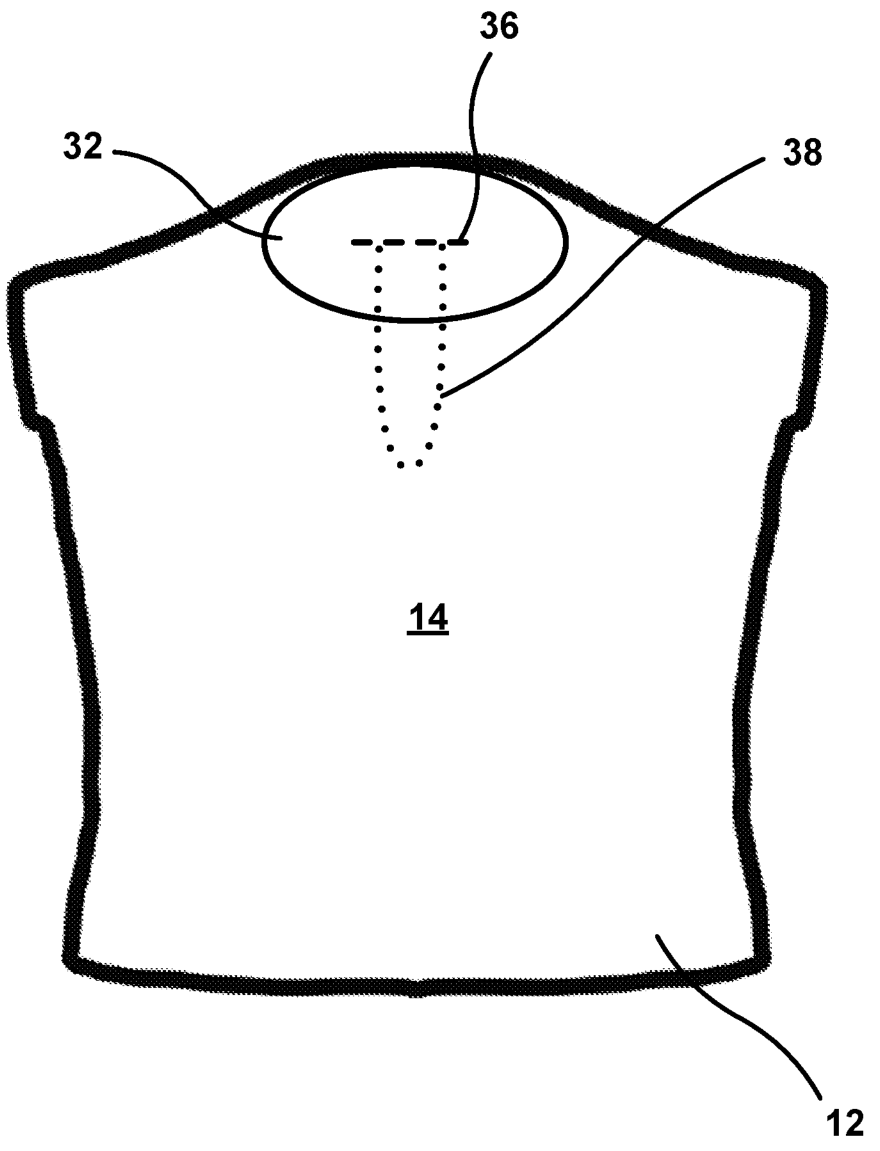
FIG. 6C is a front elevational view of the apparatus for displaying shown in FIG. 6A, wherein the truncated neck surface includes an opening therein.

With reference specifically now to FIGS. 6A-6C and 7, the core (12) of resilient material may also include a truncated neck surface (32) extending between the chest simulating surface (14) and the back simulating surface (16). The truncated neck surface (32) may include printed material (34) thereon (as shown in FIG. 6B), the printed material sized and positioned for display through a neck opening of the shirt when the shirt is disposed on the apparatus. Instead, or in addition, the truncated neck surface (32) may include an opening (36) formed therein, which optionally may also be provided with a cavity (38) in communication with the opening (36) (as shown in FIG. 6C). As shown, the opening (36) may take the form of a linear slit, although other configurations (such as an arcuate slit or a serrated slit) are also contemplated.

Figure 7:
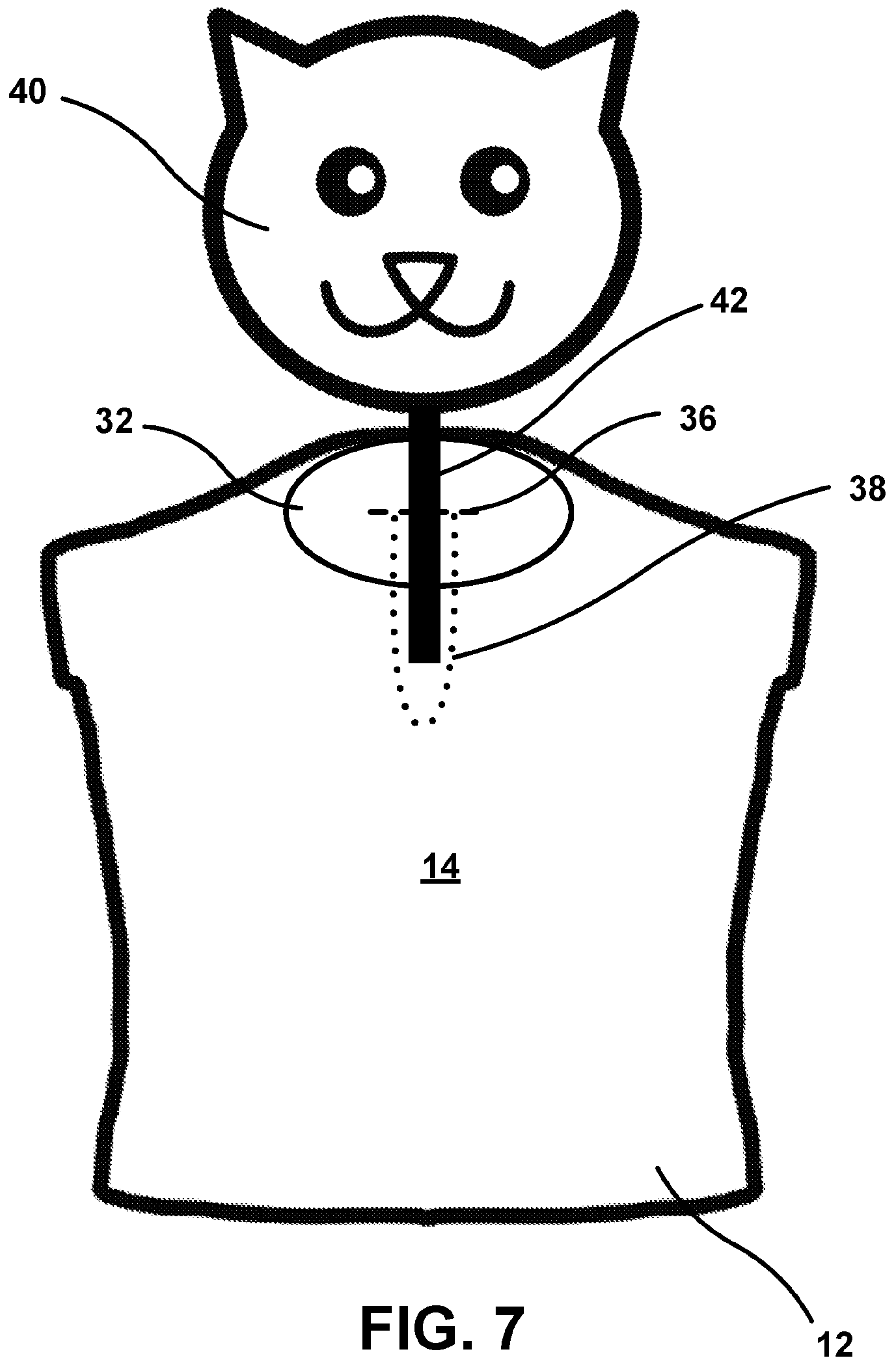
FIG. 7 is a front partially broken away view of the apparatus for displaying shown in FIG. 6C, further including a display enhancement in the form of a novelty image installed in the opening formed in the truncated neck surface.

As shown in FIG. 7, the opening (36) in the truncated neck surface (32) may be adapted to receive at least one display enhancement (40). For example, as shown, the display enhancement may take the form of a two-dimensional or three-dimensional head (such as a human head, animal head, alien head, etc.). However, various other helpful and/or humorous display enhancements are also contemplated, such as, but not limited to, signs, graphics, or images configured to display facing forward. These display enhancements may comprise pricing, merchandise descriptions, a caricature or photo-realistic face, or any of various other helpful display devices. In whatever form, the display enhancement (40) includes a mounting portion (42), which is received in the opening (36) in the truncated neck surface (32) in order to secure the display enhancement (40) in place.

The core (12) of resilient material may be formed of any one or a combination of appropriate materials, including the following: feathers, polymeric foam, natural fibers and synthetic fibers. In certain situations, it has been found that skinned polyurethane foam provides advantageous results. When employed, the skin may be one or a combination of for example, but not limited to, a solid color, a pattern of colors, an artistic design, caricature art, a logo, a slogan, or a photo-realistic representation of an actual or stylized human torso.

Alternately, forming the core (12) of resilient material from at least one layer of polyester fiber batting, in particular densified polyester fiber batting, has been found to provide excellent results. Even more particularly, it has been found that particularly advantageous results can be achieved employing at least one layer of polyethylene terephthalate (commonly known by the brand name Dacron®) fiber batting.

Figure 8A:
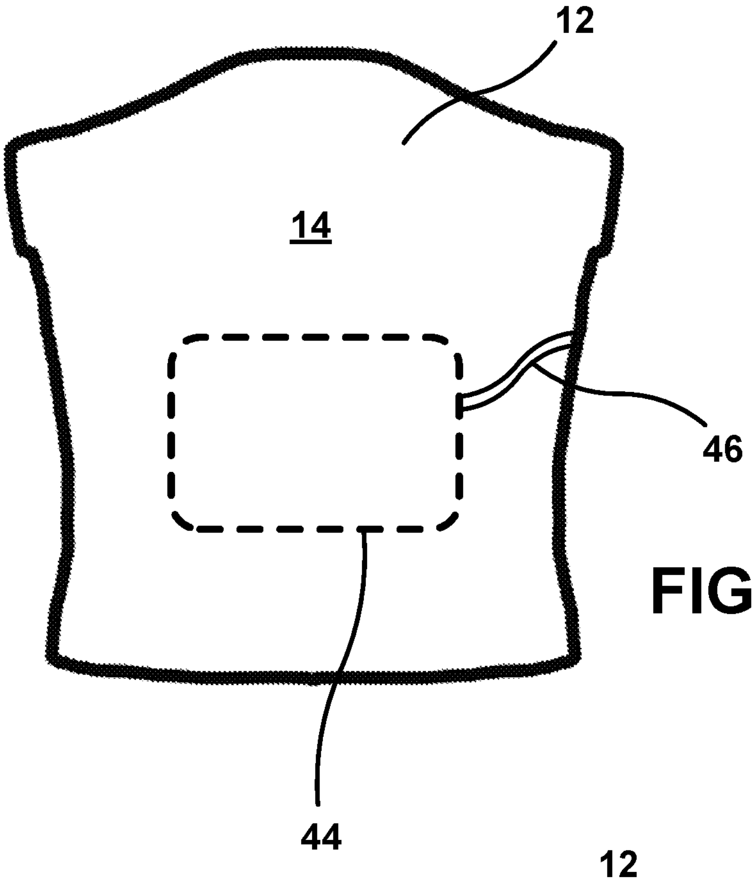
FIG. 8A is a front elevational view of the apparatus for displaying a shirt of FIG. 1, shown with various optional features.
Figure 8B:
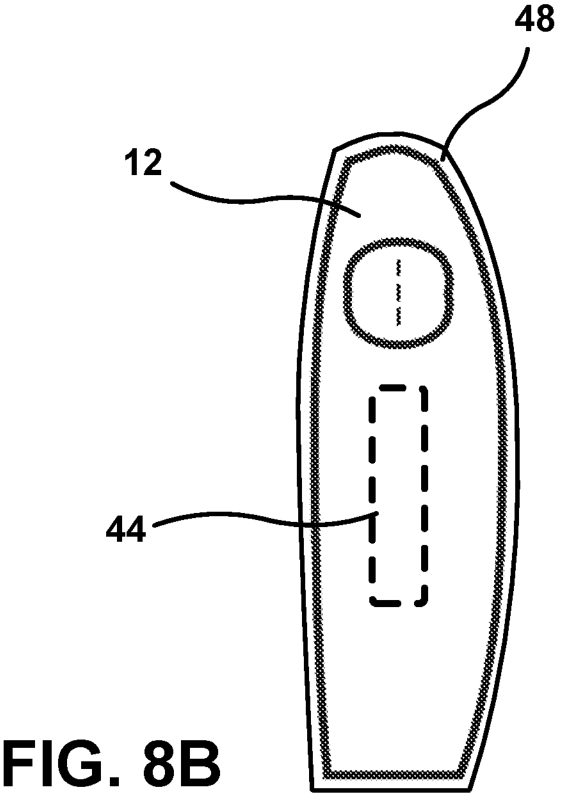
FIG. 8B is a side elevational view of the apparatus for displaying a shirt of FIG. 1, shown with various optional features.

Referring now to FIGS. 8A and 8B, various other advantageous features of the present invention are shown. In some situations, it has been found that providing the core (12) of resilient material with an inflatable air-filled portion (44) provides beneficial results. This configuration, for example, may allow for a reduction in materials, and consequently a reduction in costs, and/or may allow for a lower weight apparatus (10). The air-filled portion (44) may be pre-filled with air, or, as shown in FIG. 8A, it may include a tube (46) or some other mechanism by which the user may inflate the air-filled portion after purchase, thereby allowing for more efficient shipping by reducing space requirements.

As shown specifically in FIG. 8B, the core (12) of resilient material may further include an outer material layer (48), which may optionally be removable. When removeable, one or more fastening devices may be provided for to facilitate retention and removal. Advantageously, the outer material layer (48) is formed from a material that possesses at least one of the following properties: water resistance, mold resistance, mildew resistance and stain resistance. The outer material layer (48) may be fabric or may be fabric-like material woven, sewn, or otherwise assembled or manufactured in the specific, stylized or general shape resembling a human torso. The outer material layer (48) may be a solid color, may be a printed pattern or image and/or may be a woven pattern.

Figure 9:
FIG. 9 is a side isometric view of the apparatus for displaying a shirt of FIG. 1, shown with an optional extension member attached to the waist portion thereof.
Figure 10:
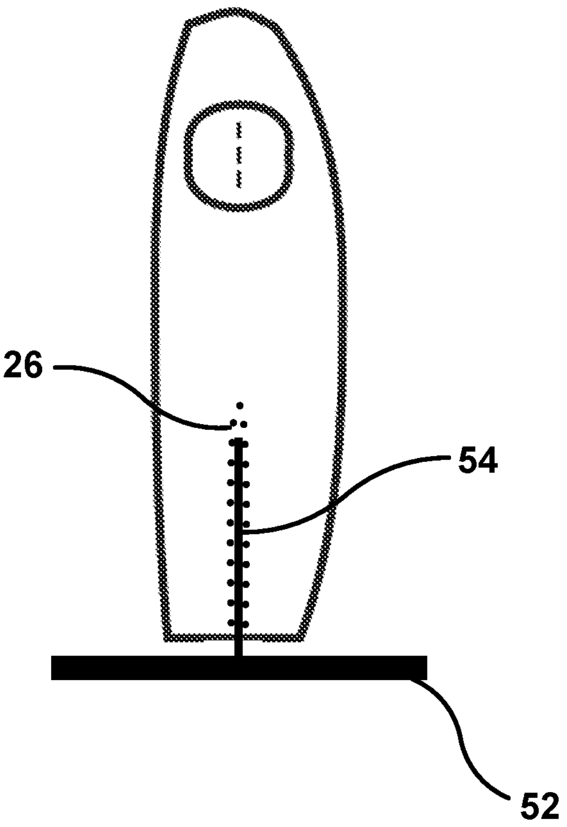
FIG. 10 is a side partially cut away view of the apparatus for displaying a shirt of FIG. 1, shown with an optional stand accessory attached to the waist portion thereof.

With reference now to FIG. 9, the apparatus (10) may further include a torso extension member (50) attachable to the truncated waist surface (22). Although not explicitly shown in the FIG., the torso extension member (50) may be attached to the truncated waist surface (22) by cooperation of a mounting portion, which is received in the opening (26) in the truncated waist surface (22) in order to secure the torso extension member (50) in place, in much the same was as the display enhancement (40) is secured in place by way of the mounting portion (42) being received in the opening (36) in the truncated neck surface (32), as shown in FIG. 7. The torso extension member (50) may be desirable, for example, when shirts sized for tall persons are to be displayed.

Instead, or in addition, to torso extension member (50), the apparatus (10) may further include a stand accessory (52) adapted to position the apparatus (10) in an upright orientation to further enhance display. As with the torso extension member (50), the stand accessory (52) may include a mounting portion (54), which is received in the opening (26) in the truncated waist surface (22) in order to secure the stand accessory (52) in place. The stand accessory (52) may be constructed in such a way as to be easily assembled and disassembled, such that it may be packed flat for transporting or storage.

The present invention thus provides a method and apparatus for displaying a shirt, such as a t-shirt, that is relatively lightweight and amenable to handling, that is particularly well-suited for in-home or in-office use, and that does not require alteration of and/or damage to the shirts being displayed, whereby shirts being displayed can be quickly and fully returnable to wearable status.

In one sense, disclosed is an apparatus for displaying shirts, which is comprised of the following components:

1. A soft or semi-soft human upper-torso shaped unit made of polymeric foam;
2. having a front side, back side, right side, left side, top, and bottom;
3. with the front and back sides being substantially parallel to each other;
4. the right and left sides being substantially parallel to each other;
5. and the top and bottom likewise being substantially parallel to each other;
6. in dimensions relative to standard clothing sizes;
7 having slit-like openings under both "shoulders" at both the left and right side arm-socket locations;
8. where the slit-like openings can be straight or curved in appearance;
9. and be situated within the approximate dimensions of the arm-socket locations;
10. the finished dimensions of which will change with the overall size of the device relative to standard clothing sizes;
11. these openings may be vertical, horizontal, or another position that fits within the dimensions of the arm-socket locations such that they are functional for their intended purpose;
12. and there is a larger slit-like opening located on the bottom of the device;
13. with a slit-like opening which can be straight or curved in appearance;
14. appearing inside the overall dimensions of the bottom of the device;
15. and is placed within the dimensions of the bottom of the device;
16. the finished dimension of which will change with the overall size of the device relative to standard clothing sizes.

These components are arranged and appear as follows: to present the viewer with the appearance of a human torso with mostly truncated arms.

The associated method of using the apparatus according to the present invention is made up of the following steps:

1. Select an appropriately sized shirt-type garment such as a novelty, pre-printed t-shirt that is desired for display corresponding in size to the indicated size of the base device;
2. Notice that the device resembles a human torso;
3. Notice that there is a top which appears to be the shoulders of a torso with no neck present and a bottom where the torso shape is cut off above what could be considered the waist area;
4. Notice that there is a front that may or may not appear to have chest-like features and a back that is generally more flat in appearance;
5. Notice that the left and right sides appear to be symmetrical and mirror each other in opposition, similar to how a human torso appears;
6. Hold the device such that it is upright with the front of the torso facing toward you;
7. Grip the desired t-shirt right side up such the front of the shirt is also facing you;
8. Position the selected t-shirt over the top of the device as though attempting to dress it in the garment by lowering the t-shirt over the device such that the top of the device becomes inserted into the lower portion of the selected t-shirt;
9. Continue lowering the t-shirt until the shoulders of the t-shirt meet with the top of the device;
10. Ensure that the t-shirt is positioned correctly over the form such that it appears to be stretched uniformly over the device from side to side and conforms relatively to the torso-like appearance of the device such that it appears torso-like in its overall presentation;
11. Tuck the t-shirt sleeves into both the left and right side upper-arm-located slit openings such that any design on the upper portion of the t-shirt is clearly and cleanly visible across the upper portion of the device;
12. Tilt the device away from the user such that it is resting on its back;
13. Tuck the lower portion of the t-shirt into the wide slit opening in the bottom of the base of the device in such a way as to pull the face of the shirt taut but not tight across the front of the device from top to bottom;
14. If the selected garment is oversized, it may be necessary to gather and gently fold in creases in the shirt toward the rear of the device such that the front of the selected garment may be clearly and cleanly visible.

The apparatus (10) according to the present invention is unique when compared with other known devices and independent vendor solutions because it: (1) is instantly re-configurable; (2) is infinitely configurable; (3) presents little possibility of breakage; and (4) is easily transportable. Similarly, the associated method is unique in that it: (1) is easy to carry out; (2) can be completed without fear of garment damage; and (3) allows shirts to be professionally displayed under less-than-ideal conditions.

The apparatus (10) according to the present invention is further unique when compared with other known devices and independent vendor solutions because it provides: (1) lightweight structure; (2) the ability to function as stated under virtually any conditions; (3) little possibility of breakage; (4) easy transportability; and (5) slit pockets allowing for a presentable appearance.

Furthermore, the process associated with the inventive apparatus (10) is likewise unique. More specifically, the disclosed process owes its uniqueness to the fact that it: (1) is easy to re-configure in a presentable form because of the ability to tuck in sleeves and bottom of the torso; (2) can be handled without concern for garment damage; (3) allows shirts to be quickly and neatly displayed under less-than-ideal or temporary conditions; and (4) is easy to use by non-professional personnel.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An apparatus particularly adapted for displaying a shirt when the shirt is disposed on said apparatus, said apparatus comprising:

a core of resilient material configured to simulate a human torso, said core of resilient material comprising:

a chest simulating surface, a back simulating surface, left and right truncated shoulder surfaces extending between said chest simulating surface and said back simulating surface; and a truncated waist surface extending between said chest simulating surface and said back simulating surface;

wherein each of said left and right truncated shoulder surfaces has an opening formed therein, said opening adapted to receive arm portions of the shirt when the shirt is disposed on said apparatus; and wherein said truncated waist surface has an opening formed therein, said opening adapted to receive a waist portion of the shirt when the shirt is disposed on said apparatus.

2. The apparatus of claim 1 wherein said left and right truncated shoulder surfaces are generally parallel to one another and said truncated waist surface is generally perpendicular to said left and right truncated shoulder surfaces.

3. The apparatus of claim 1 wherein the openings formed in said left and right truncated shoulder surfaces and the opening formed in said truncated waist surface each comprises a slit.

4. The apparatus of claim 3 wherein the openings formed in said left and right truncated shoulder surfaces and the opening formed in said truncated waist surface each further comprises a cavity in said core of resilient material in communication with said slit, each cavity adapted to receive shirt material inserted through said slit.

5. The apparatus of claim 3 wherein the slits formed in said left and right truncated shoulder surfaces and the slit formed in said truncated waist surface each comprises a generally linear slit disposed generally parallel to said chest simulating surface and said back simulating surface.

6. The apparatus of claim 3 wherein the slits formed in said left and right truncated shoulder surfaces and the slit formed in said truncated waist surface each comprises a generally arcuate slit.

7. The apparatus of claim 3 wherein the slits formed in said left and right truncated shoulder surfaces and the slit formed in said truncated waist surface each comprises a serrated slit.

8. The apparatus of claim 1 wherein said core of resilient material further comprises a truncated neck surface extending between said chest simulating surface and said back simulating surface.

9. The apparatus of claim 8 wherein said truncated neck surface comprises printed material thereon, said printed material sized and positioned for display through a neck opening of the shirt when the shirt is disposed on said apparatus.

10. The apparatus of claim 8 wherein said truncated neck surface comprises an opening formed therein, the opening in said truncated neck surface being adapted to receive at least one display enhancement.

11. The apparatus of claim 1 wherein the resilient material comprises at least one of the following: feathers, polymeric foam, natural fibers and synthetic fibers.

12. The apparatus of claim 11 wherein the resilient material comprises skinned polyurethane foam.

13. The apparatus of claim 11 wherein the resilient material comprises at least one layer of polyester fiber batting.

14. The apparatus of claim 13 wherein the at least one layer of polyester fiber batting comprises at least one layer of densified polyester fiber batting.

15. The apparatus of claim 13 wherein the at least one layer of polyester fiber batting comprises at least one layer of polyethylene terephthalate fiber batting.

16. The apparatus of claim 1 wherein the core of resilient material further comprises an inflatable air-filled portion.

17. The apparatus of claim 1 wherein the core of resilient material further comprises an outer material layer.

18. The apparatus of claim 17 wherein said outer material layer is removable.

19. The apparatus of claim 17 wherein said outer material layer is formed from a material that possesses at least one of the following properties: water resistance, mold resistance, mildew resistance and stain resistance.

20. The apparatus of claim 1 further comprising a torso extension member attachable to said truncated waist surface.

21. The apparatus of claim 20 wherein said torso extension member is attachable to said truncated waist surface by cooperation with the opening formed in said truncated waist surface.

22. The apparatus of claim 1 further comprising a stand accessory adapted to position said apparatus in an upright orientation.

23. The apparatus of claim 22 wherein said stand accessory cooperates with the opening formed in said truncated waist surface.

24. An apparatus particularly adapted for displaying a shirt when the shirt is disposed on said apparatus, said apparatus comprising:

a core of resilient material configured to simulate a human torso, said core of resilient material comprising:

a chest simulating surface, a back simulating surface, left and right truncated shoulder surfaces extending between said chest simulating surface and said back simulating surface, said left and right truncated shoulder surfaces being generally parallel to one another;

a truncated waist surface extending between said chest simulating surface and said back simulating surface, said truncated waist surface being generally perpendicular to said left and right truncated shoulder surfaces; and a truncated neck surface extending between said chest simulating surface and said back simulating surface;

wherein each of said left and right truncated shoulder surfaces has a slit formed therein, said slit adapted to receive arm portions of the shirt when the shirt is disposed on said apparatus; and wherein said truncated waist surface has a slit formed therein, said slit adapted to receive a waist portion of the shirt when the shirt is disposed on said apparatus.

25. The apparatus of claim 24 wherein the slits formed in said left and right truncated shoulder surfaces and the slit formed in said truncated waist surface each further comprises a cavity in said core of resilient material in communication with said slit, each cavity adapted to receive shirt material inserted through said slit.

26. The apparatus of claim 24 wherein said truncated neck surface comprises printed material thereon, said printed material sized and positioned for display through a neck opening of the shirt when the shirt is disposed on said apparatus.

27. The apparatus of claim 24 wherein said truncated neck surface comprises an opening formed therein, the opening in said truncated neck surface being adapted to receive at least one display enhancement.

28. A combined shirt and display apparatus comprising:

a core of resilient material configured to simulate a human torso, said core of resilient material comprising:

a chest simulating surface, a back simulating surface, left and right truncated shoulder surfaces extending between said chest simulating surface and said back simulating surface; and a truncated waist surface extending between said chest simulating surface and said back simulating surface;

a shirt positioned over said core of resilient material with arm portions of said shirt positioned adjacent to said left and right truncated shoulder surfaces and with a waist portion of said shirt positioned adjacent to said truncated waist surface;

wherein each of said left and right truncated shoulder surfaces has an opening formed therein, said opening receiving therein the arm portions of said shirt; and wherein said truncated waist surface has an opening formed therein, said opening receiving therein the waist portion of said shirt.

* * * * *